United States Patent [19]

Duff

[11] 4,387,661
[45] Jun. 14, 1983

[54] AMPHIBIOUS MOTOR-DRIVEN CYCLE

[76] Inventor: Kenneth R. Duff, 7729 Dolly Dr., Lorton, Va. 22079

[21] Appl. No.: 312,842

[22] Filed: Oct. 19, 1981

Related U.S. Application Data

[63] Continuation of Ser. No. 109,226, Jan. 3, 1980, abandoned.

[51] Int. Cl.³ ............................................. B63B 35/00
[52] U.S. Cl. ............................... 114/270; 114/145 R; 440/90
[58] Field of Search ...................... 114/270, 283-285, 114/145 R; 440/12, 90; 180/227, 219; 280/303

[56] References Cited

U.S. PATENT DOCUMENTS

| | | | |
|---|---|---|---|
| D. 175,975 | 11/1955 | Piatti | 180/219 X |
| 2,018,531 | 10/1935 | Pawsat | 280/301 |
| 2,075,785 | 4/1937 | Caneghem | 114/270 |
| 2,225,914 | 12/1940 | Lewis et al. | 180/219 |
| 2,551,982 | 5/1951 | Verkins | 180/227 |
| 3,213,821 | 10/1965 | Godwin | 114/270 |
| 3,215,114 | 11/1965 | Jenkins | 114/270 |
| 3,272,171 | 9/1966 | Korcak | 114/145 |
| 3,359,937 | 12/1967 | D'Arena | 114/270 |
| 3,397,669 | 8/1968 | Katehis | 114/270 |
| 3,848,560 | 11/1974 | Du Bose | 114/270 |
| 3,853,085 | 12/1974 | Halboth | 114/270 |
| 3,934,669 | 1/1976 | Adams | 180/220 |
| 3,954,079 | 5/1976 | Gof | 440/31 |
| 4,092,945 | 6/1978 | Ankert et al. | 114/270 |

Primary Examiner—Trygve M. Blix
Assistant Examiner—Stephen P. Avila
Attorney, Agent, or Firm—LeBlanc, Nolan, Shur & Nies

[57] ABSTRACT

An amphibious two-wheeled cycle having an occupant-receiving hull secured to and receiving a frame and provided with front and rear wheel wells, a steerable front wheel supported by the frame and partially received in the front wheel well, and a motor-driven rear wheel supported from the frame and partially received in the rear wheel well. The front wheel well is defined by a special unit which provides a substantially watertight continuation of the hull but which allows unimpeded turning movement of the front wheel about a steering axis for steering the vehicle on land.

23 Claims, 11 Drawing Figures

AMPHIBIOUS MOTOR-DRIVEN CYCLE

This is a continuation of application Ser. No. 109,226, filed Jan. 3, 1980 now abandoned.

FIELD OF INVENTION

This invention relates to amphibious motor-driven cycles such as motorcycles and mopeds and is particularly concerned with a unique amphibious cycle construction which is convenient and easy to drive in water and on the land without requiring any adjustment or modification in switching between land and water travel.

BACKGROUND

Prior to this invention various proposals have been made for converting bicycles and motorcycles into amphibious vehicles for both water and land travel. Representative teachings of such proposals are found in U.S. Pat. No. 3,359,937 which issued on Dec. 26, 1967, U.S. Pat. No. 3,848,560 which issued on Nov. 19, 1974, U.S. Pat. No. 4,092,945 which issued on June 6, 1978, U.S. Pat. No. 3,215,114 which issued on Nov. 2, 1965 and U.S. Pat. No. 3,954,079 which issued on May 4, 1976.

In general the amphibious constructions described in the foregoing patents involve the addition of outboard floatation devices to the cycle such as water skis, tanks or pontoons to make the vehicle floatable on water. Pontoon floatation devices of the type shown in U.S. Pat. No. 3,215,114 seriously impair the maneuverability of the vehicle as well as making the vehicle bulky and heavy. Outboard floatation devices, such as that shown in U.S. Pat. No. 3,848,560, do not afford sufficient stability for safely crossing relatively wide, rough rivers or similar bodies of water, thus restricting the use of the amphibious vehicle in water travel.

In addition to the foregoing, floatation devices such as the one described in U.S. Pat. No. 3,359,937 inconveniently require adjustment to floatation positions before entering the water for water travel and then require readjustment back to stowed positions for land travel. Finally, a driver of the amphibious vehicles described in the foregoing patents unavoidably becomes wet during water travel, thus requiring him to dress accordingly.

The present invention has none of the foregoing drawbacks and offers additional advantages as will become apparent from the following summary and detailed description.

SUMMARY AND OBJECTS OF THE INVENTION

In the illustrated embodiment of this invention a single, occupant-carrying hull is mounted on the wheel support frame of the two-wheeled cycle and extends completely around both wheels in symmetrical relation to the cycle's longitudinal axis. The single hull is advantageously of light weight, unitary, streamlined construction and is provided with front and rear wheel wells for partially receiving the ground-engaging wheels of the cycle. By this construction the water-immersed parts of the vehicle create a relatively low resistance to travel of the vehicle in the water.

The front and rear wheel wells provide watertight continuations of the hull at least below the water line. The front wheel well is defined by a unique unit which allows unimpeded turning of the front wheel and fork assembly for steering the vehicle on land as well as permitting unimpeded up-down displacement of the front wheel and fork assembly under the influence of front wheel shock absorbers. The watertight, wheel-receiving well construction prevents entry of any substantial amount of water into the driver's space which is located within the hull itself.

In order to propel the amphibious vehicle through the water, the motor-driven rear wheel is provided with a set of angularly spaced apart vanes or fins projecting inwardly from the rear wheel rim.

According to a further feature of this invention a pair of flaps are used to steer the vehicle in the water. These steering flaps are disposed one on each side of the hull's longitudinal axis and are each depressable or displaceable independently of each other to positions where they project below the hull into the water to create resistance for turning the vehicle in one direction or the other. The steering flaps each may be constructed to further serve as kick stands for supporting the vehicle on land.

Because of the foregoing construction the amphibious motor-driven cycle of this invention is easily maneuverable on land and in water, requires no adjustments or modifications in switching between water and land travel, is capable of safely crossing large, relatively rough bodies of water such as rivers, and provides a normally dry, water-free compartment or hull space for the driver or occupant. Furthermore, the amphibious vehicle of this invention is economical to make, can easily be manufactured by converting a moped or motorcycle and affords an inexpensive mode of land-water transportation.

Because of the advantageous features set forth above, the amphibious cycle of this invention may be used for a variety of different purposes, such as civil defense, military, water patrols, commuting, fishing, duck hunting, or other recreational activities.

With the foregoing in mind the general aim and purpose of this invention is to provide a novel amphibious motor-driven cycle which is simple in construction, economical to manufacture, and inexpensive and easy to operate on land and in water.

Another important object of this invention is to provide a novel amphibious motor-driven cycle which has no outboard floatation devices such as pontoons or the like and which requires no adjustments or modifications in switching between water and land travel.

A more specific object of this invention is to provide a novel amphibious motor-driven cycle in which a single unitary hull of light weight material is secured to the cycle's frame and is provided with front and rear wheel-receiving wells constructed to keep water from entering into the interior of the hull.

Other important objects of this invention reside in the provision of a novel amphibious motor-driven cycle having:

1. A unique front-wheel water-sealing unit which prevents entry of the water through the opening in the hull for the front wheel, but which allows unimpeded turning movement of the front wheel and fork assembly for steering the vehicle on land, as well as permitting displacement of the front wheel and fork assembly under the action of the vehicle's front wheel shock absorbers if such shock absorbers are employed in the cycle.

2. A novel dual flap assembly for steering the vehicle in the water.

3. A unique water-propulsion arrangement comprising a plurality of vanes or fins projecting inwardly from the rim of the motor-driven rear wheel.

Further objects of this invention will appear as the description proceeds in connection with the appended claims and below-described drawings.

DETAILED DESCRIPTION

In the illustrated embodiment, the amphibious vehicle of this invention is shown to mainly comprise a wheel and hull support frame 20, a pair of frame-supported, ground-engaging front and rear wheels 22 and 24 arranged one behind the other in the usual manner, and a rigid, unitary floatation hull 26 fixed to frame 20 to be supported thereby when the vehicle is on land. Wheels 22 and 24 may be of the typical spoke type shown in the drawings. Wheels 22 and 24 extend through separate openings in the bottom of hull 26 as shown.

Figure 3:
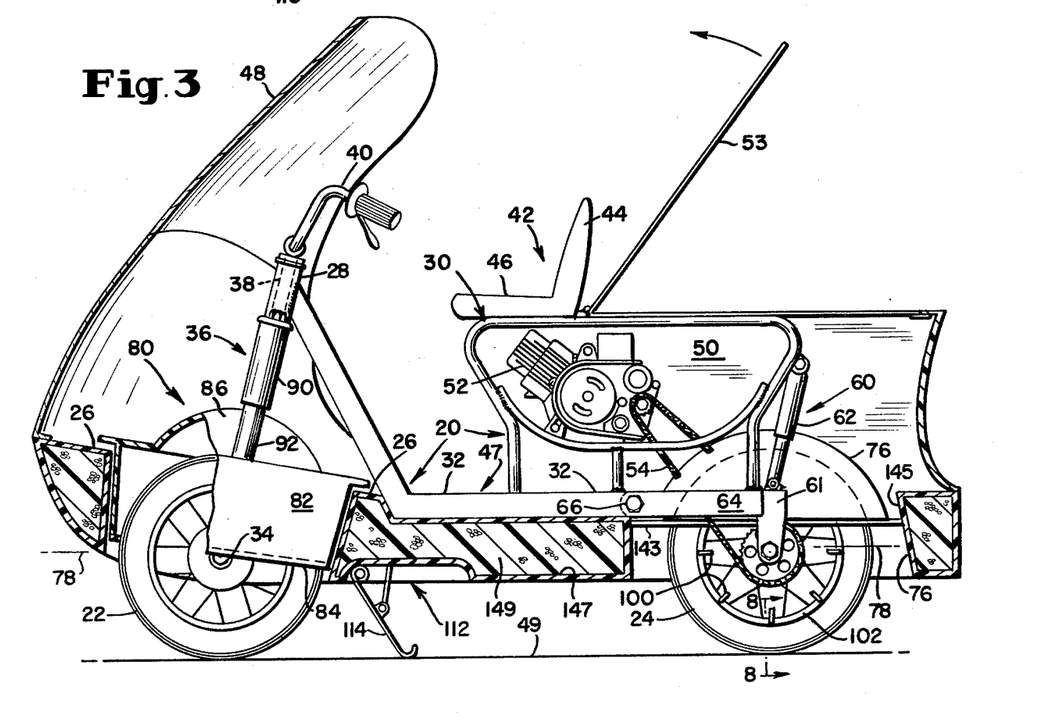
FIG. 3 is a longitudinal section taken substantially along lines 3—3 of FIG. 1A.
Figure 4:
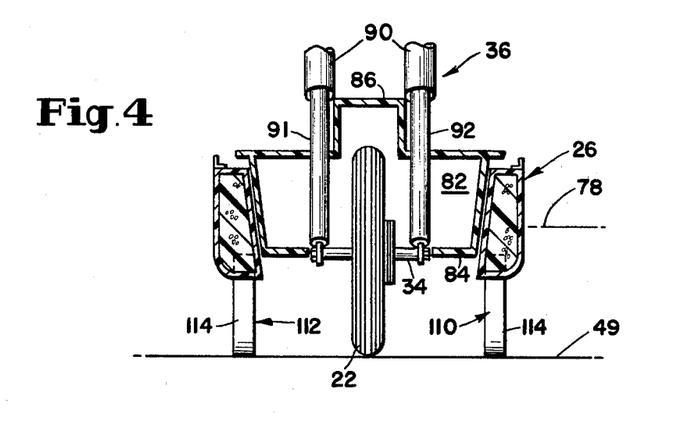
FIG. 4 is a transverse section taken substantially along lines 4—4 of FIG. 1A.
Figures 5, 6, 7:
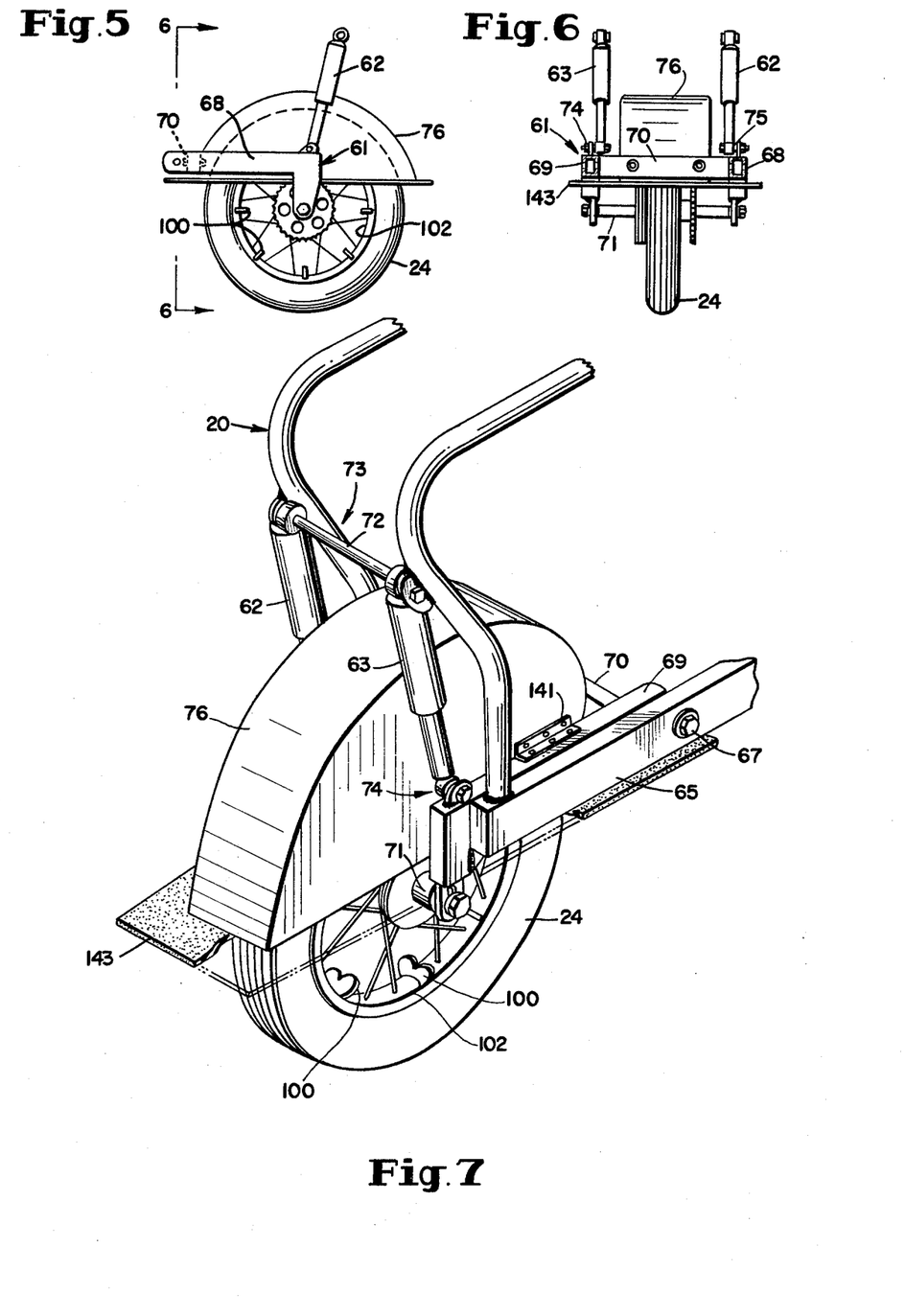
FIG. 5 is a side elevation of the frame and rear wheel subassembly shown in the preceding Figures.
FIG. 6 is a transverse section taken substantially along lines 6—6 of FIG. 5.
FIG. 7 is a perspective view of the rear wheel suspension shown in FIG. 5.

As best shown in FIG. 3, frame 20 is of rigid unitary construction and preferably comprises a front head tube portion 28, a raised rear portion 30 and a downwardly offset portion 32 extending rearwardly from head portion 28. It will be appreciated that frame 20 may be of any other suitable construction.

The front wheel 22 is conventionally mounted on an axle 34 which is supported at opposite ends on spaced apart fork arms straddling the front wheel and forming a part of a fork assembly 36. Fork assembly 36 is of conventional construction such as the type used in mopeds and may or may not include front wheel shock absorbers. Fork assembly 36 may terminate at its upper end in a fork axle 38 which is conventionally journalled in the head tube portion 28 of frame 20 in the manner shown. Steering handlebars 40 are suitably fixed to the fork axle and carry the usual brake and accelerator controls in the region of the handlebar grips.

Hull 26 may advantageously be molded or otherwise fabricated in one piece from such light weight material as fiberglass or aluminum and is rigidly fixed to and supported by frame 30 by any suitable means such as brackets, bolts, screws or other fasteners (not shown). Hull 26 is supported symmetrically with respect to the longitudinal axis of frame 20 and extends completely around both the front and rear wheels 22 and 24 such that the wheels lie within the outer perimeter of the hull along the hull's longitudinal axis. The lower portion of frame 20 is received in hull 26 as shown. A driver's seat 42 is positioned in the hull 26 and is suitably fixed to frame portion 30 by any suitable means (not shown). Seat 42 is positioned about midway between the bow and stern of hull 26 behind handlebars 40 at a region lying between wheels 22 and 24. In the illustrated embodiment seat 42 is formed with a seat back portion 44 extending upwardly from a seat pan portion 46 for the comfort of the driver. As shown, seat 42 extends between the opposite sides of hull 26 in a hollow driver-passenger compartment 47 which is defined by the interior of hull 26.

Hull 26 extends both forwardly of front wheel 22 and rearwardly of rear wheel 24. A transparent wind screen 48 is mounted on the raised bow of hull 26 and extends upwardly from the bow at a region lying just forwardly of handlebars 40 for the comfort and safety of the driver.

Figure 1:
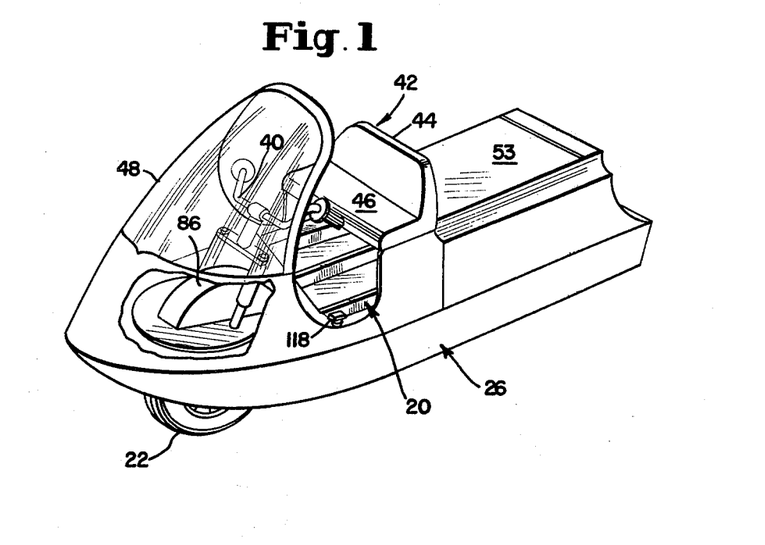
FIG. 1 is a perspective view of a two-wheel amphibious motor-driven moped incorporating the principles of this invention.
Figure 1A:
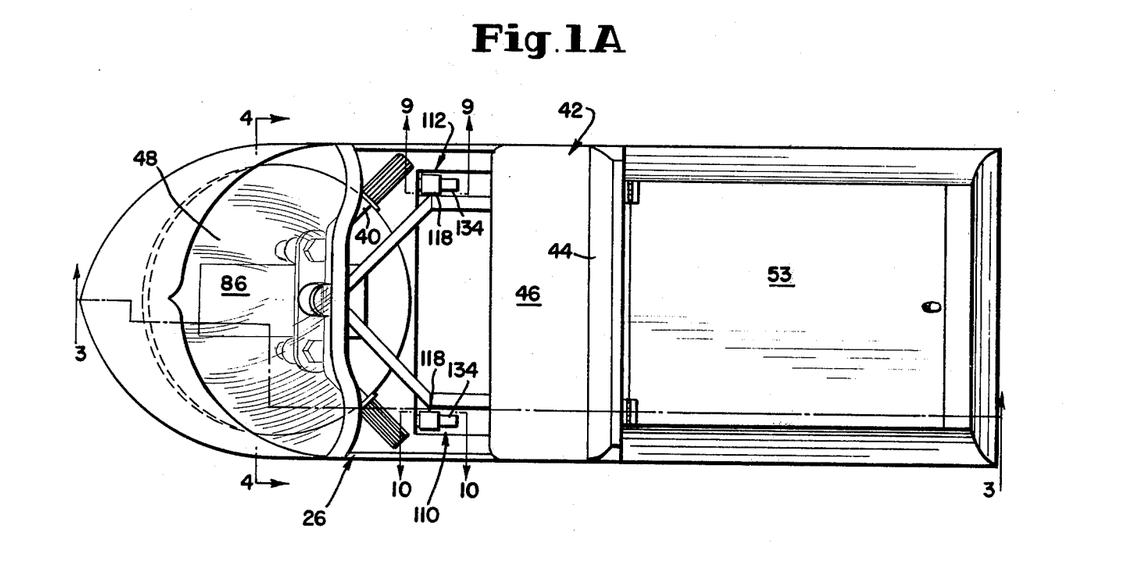
FIG. 1A is a plan view of the amphibious vehicle shown in FIG. 1.
Figure 2:
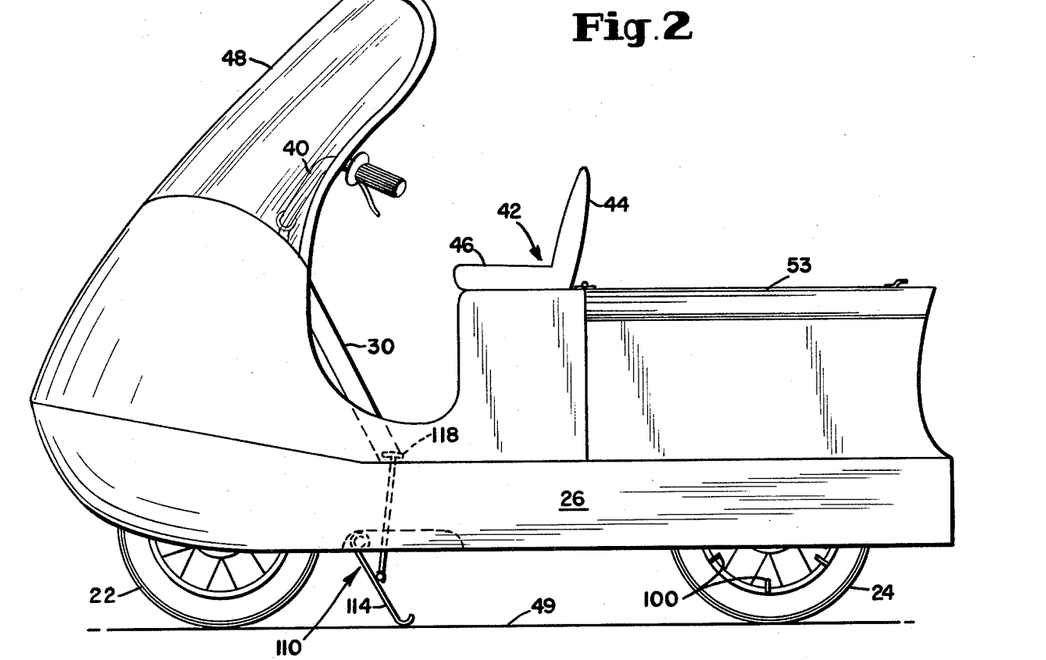
FIG. 2 is a side elevation of the amphibious vehicle shown in FIG. 1.

As best shown in FIG. 2, hull 26 has a streamlined configuration to minimize resistance to travel in water. The bottom of hull 26 is raised above the wheel engaging ground plane 49 to provide adequate ground clearance for travel over land. The bottom of hull 26 may be in a plane just below the plane containing the rotational axes of wheels 22 and 24 when the vehicle is supported on land as shown in FIG. 2.

In the illustrated embodiment the sides of hull 26 are built up just behind seat back 44 to define an engine or motor compartment space 50 (see FIG. 3) for receiving an engine or motor 52. The motor 52 is mounted on frame 20 just rearwardly of seat back 44 and is drive connected to rear wheel 24 by any suitable means such as a sprocket drive chain 54. Motor 52 may be an air-cooled gasoline engine. Alternatively it may be an electric, battery-powered motor. The upwardly opening face of compartment 50 may advantageously be closed by a cover or lid 53. Lid 53 is pivotally secured to hull 26, allowing it to be raised to an open position to afford access to motor 52.

A suitable suspension for supporting rear wheel 24 from frame 20 is generally indicated at 60 and comprises a rigid framework 61 and a pair of shock absorbers 62 and 63. Framework 61 lies between the rearward end portions of a pair of parallel, horizontally extending frame members 64 and 65 and is pivotally secured at its forward end to members 64 and 65 by any suitable pivot means such as a pair of axially aligned bolt and nut assemblies 66 and 67. Members 64 and 65 form a part of frame 20.

As shown, framework 61 is formed with a pair of axle-mounting arm portions 68 and 69 extending on opposite sides of wheel 24 and rigidly joined together by a cross piece 70. The rear wheel axis 71 is non-rotatably mounted on arm portions 68 and 69.

The assembly of rear wheel 24 and framework 61 is therefore pivotable about a horizontal pivot axis which is provided by assemblies 66 and 67, such pivot axis being located forwardly of wheel 24 and extending parallel to the rotational axis of wheel 24.

The upper ends of shock absorbers 62 and 63 are pivotally mounted on a bolt 72 of a removable nut and bolt assembly 73 which is secured to the rearward end of frame 20. The upper ends of shock absorbers are thus pivotable about the axis of bolt 72 which extends horizontally in parallel relation to the rotational axis of wheel 24. The lower end of shock absorber 62 is pivotally secured to arm portion 69 by suitable pivot means 74, and the lower end of shock absorber 63 is pivotally secured to arm portion 68 by suitable pivot means 75. Shock absorbers 62 and 63 are arranged in parallel spaced apart relation on opposite sides of rear wheel 24 as shown.

From the foregoing description it will be appreciated that the assembly of rear wheel 24 and framework 61 is pivotable upwardly and downwardly under the action of shock absorbers 62 and 63 as the vehicle is driven over land.

In the illustrated embodiment, the rear wheel suspension assembly includes a downwardly opening rear wheel well 76, the lower edge of which lies just below the hub of rear wheel 24 such that the upper portion of wheel 24 is received in well 76. Well 76 is watertight below the hull's water line (indicated at 78).

Bolt 72 is manually removable to uncouple the upper ends of shock absorbers 62 and 63 from frame 20, thus releasing the assembly of framework 61 and rear wheel 24 for downward pivotal displacement when the rear end of the amphibious vehicle is jacked up. By such operation rear wheel 24 may be swung downwardly from hull 26 by a sufficient distance to simplify access to the rear wheel for the purpose of changing a tire or performing other work on the rear wheel.

At the forward end of the amphibious vehicle of this invention a special front wheel well assembly 80 provides a well which receives the upper portion of front wheel 22 and which is watertight at least below the hull's water line 78. Assembly 80 comprises a hollow, conical or downwardly tapered member 82, a lower disc member 84 received in the lower end of member 82 and suitably fixed to member 82, and an upper fender-like cover member 86 covering the open upper end of member 82 and fixed to member 82 by any suitable means. The fork arms 91, 92 of fork assembly 36 extend through and are suitably fixed to member 86 below the front wheel shock absorbers 90. Fork arms 91, 92 extend on opposite sides of front wheel 22 and mount the front wheel axle. By this arrangement it will by appreciated that assembly 80 is fixed to the fork piece comprising fork arms 91, 92 such that the complete assembly of front wheel 22, the fork arms and assembly 80 are rotatable as a unit about the axis of fork axle 38 as well as being reciprocable as a unit along the axis of fork axle 38.

As shown, member 82 is interfittingly received in an opening in the bottom of hull 26 for reciprocable sliding motion along its longitudinal axis as well as rotational movement about such axis. The axis of member 82 is aligned with or at least parallel with the rotational axis of fork axle 38. The fit between member 82 and hull 26 is sufficiently close to establish an essentially watertight seal between member 82 and hull 26 without significantly impeding the rotational and sliding motion of member 82 in the bottom of the hull.

Member 86 ovelies front wheel 22 as shown. Additionally, member 86 and member 82 form the watertight well previously mentioned for receiving the upper portion of wheel 22 as well as the fork arms 91, 92. The sliding motion of member 82 in the bottom of hull 26 allows unimpeded upward and downward motion of the fork and front wheel assembly under the influence of the front wheel shock absorbers 90 during land travel of the vehicle. Rotation of the member 82 in the opening in the bottom of hull 26 affords unimpeded turning movement of the front wheel and form assembly for steering the vehicle on land.

From the foregoing it will be appreciated that the front wheel well assembly 80 provides a substantially watertight continuation of the bottom of hull 26 while at the same time permitting unimpeded rotation or turning movement of the front wheel and fork assembly about the axis of fork axle 38 for steering the vehicle on land as well as permitting upward and downward displacement of the fork and front wheel assembly under the influence of shock absorbers 90.

Front wheel 22 extends freely through an elongated aperture in the lower disc member 84 at the bottom of hull 26. When the vehicle is afloat in water, the lower disc member 84 will be disposed in the wheel opening in hull 26 at a location where it provides a smooth continuation of the bottom of hull 26.

Figure 8:
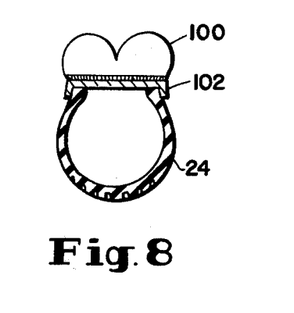
FIG. 8 is a section taken substantially along lines 8—8 of FIG. 3 and showing the configuration of the water-propelling vanes on the rear wheels.

The rear wheel 24, as well as the front wheel 22, extend downwardly beyond their respective wells to thus partially protrude below the bottom of hull 26 as shown. To propel the amphibious vehicle through the water an array of equiangularly spaced apart vanes 100 are fixed to the tire-mounting rim 102 of rear wheel 24 and project radially inwardly from rim 102. Although vanes 100 may be of any suitable configuration they are advantageously of the shape shown in FIG. 8, having two side-by-side bucket or partial cup-shaped sections to form in cross-section the upper region of a heart. Vanes 100 are effective to propel the vehicle through the water by the motor driven rotation of rear wheel 24.

Figure 9:
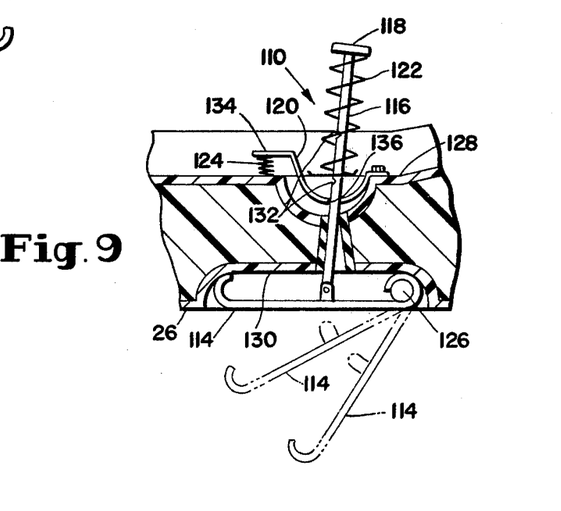
FIG. 9 is an enlarged fragmentary section taken substantially along lines 9—9 of FIG. 1A and showing the left hand steering flap mechanism.
Figure 10:
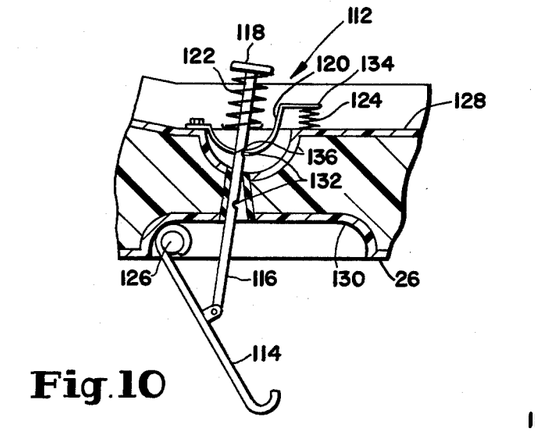
FIG. 10 is an enlarged fragmentary section taken along lines 10—10 of FIG. 1A and showing the right hand steering flap mechanism.

Referring now to FIGS. 9 and 10 a pair of foot-operated flap assemblies 110 and 112 are mounted in the bottom of hull 26 for steering the amphibious vehicle in the water. Flap assemblies 110 and 112 are symmetrically disposed on opposite sides of the longitudinal axis of hull 26 as shown, one being located for operation by the driver's left foot, and the other being located for operation by the driver's right foot.

Flap assembly 110 comprises a steering flap 114, a motion transmitting rod 116, a foot-operated pedal 118, a latch plate 120, and a pair of springs 122 and 124. Flap 114 is disposed on the underside of hull 26 and is pivotally secured at its forward end by suitable pivot means 126 to the hull's bottom. Rod 116 is pivotally secured at its lower end to an intermediate region of flap 114 and extends through openings in plate 120 and hull 26. Pedal 118 is mounted on the upper end of rod 116 within hull 26. Spring 122 may be of the coil type and is compressed between pedal 118 and an interior hull surface 128.

When no downward pressure is applied to pedal 118, flap 114 will be pivoted under the bias of spring 122 to a raised, generally horizontal, stowed or inoperative position within a downwardly opening recess 130 in the bottom of hull 26. In this position flap 114 exerts no additional surface resistance tending to turn the vehicle to the left during water travel.

Depression of pedal 118 by foot pressure or other means against the bias of spring 122 causes flap 114 to pivot about is forward end to protrude or depend downwardly below the bottom of hull 26 to a position such as that shown in phantom lines at 132 in FIG. 9, thus creating additional surface resistance to the left of the hull's longitudinal axis and thus causing the amphibious vehicle to turn or bear to the left as it is driven through the water. The resistance created by flap 114 is increased as the angle between it and the stowed position is increased. Such increased resistance reduces the turning radius of the vehicle in the water, and vice versa.

As shown in FIG. 9 a plurality of axially spaced apart notches 132 are formed in the periphery of rod 116 and cooperate with plate 120 for latching or detachably locking flap 114 in a plurality of angularly spaced apart downwardly disposed positions where it adds varying degrees of resistance to the lift side of the hull.

Plate 120 is secured at its forward end to the bottom of the hull and has a foot pedal portion 134 disposed at its rearward end within the hull just rearwardly of pedal 118. Spring 124 is compressed between the plate's pedal portion 134 and the interior hull surface 128. Plate 120 is flexible near its forward end where it is secured to the bottom of hull 26. Spring 124 normally biases the pedal portion 134 upwardly to flex plate 120 in a counterclockwise direction as viewed from FIG. 9.

Under the bias of spring 124 the rearward edge of the rod-receiving aperture 136 in plate 120 will bear against the peripheral region of rod 116 containing notches 132. Thus, as rod 116 is displaced downwardly under foot pressure applied to pedal 118 one or the other of the notches 132 in rod 116 will come into registry with the aperture 136. When this happens, the bias of spring 124 will urge plate 120 to a position where the rearward edge portion of aperture 136 seats in the notch, thus releasably latching the assembly of rod 116 and flap 114 in a downwardly depressed position where flap 114 is swung below the bottom of hull 26 by a pre-selected angle to exert the resistance for turning the amphibious vehicle to the left.

The latch provided by the rearward marginal edge of the aperture 136 is released by depressing the flexure plate's pedal portion 134 against the bias of spring 124 to downwardly flex plate 120 in a clockwise direction to move the marginal rearward edge of aperture 136 out of the notch in rod 116. When this happens, the assembly of rod 116 and flap 114 is released and thus biased by spring 122 to the stowed or inoperative position where the flap is stored in recess 130.

When plate 120 is latched in the lowermost one of the notches 132, flap 114 will be at an angle which creates a resistance of a first predetermined magnitude. When plate 120 is latched in the uppermost one of the notches in rod 116, the flap 114 will extend more vertically into the water below the hull at a greater angle with respect to the hull's bottom to create a resistance of a second predetermined magnitude which is greater than the first predetermined magnitude mentioned above. As a result, the radius of turning is decreased to enable the driver to make a sharper turn.

When plate 120 is latched in the lowermost one of the rod's notches 132 and it is desired to make still a sharper turn pedal portion 134 is momentarily depressed to release the flap, and pedal 118 is depressed during the release to downwardly displace rod 116 to a position where the uppermost one of the notches 132 registers with the aperture 136. Plate 120 will therefore latch in the uppermost one of the notches 132 to thus releasably lock flap 114 in a more vertical position. Both feet may be used to perform this operation. When the vehicle is on land flap 114 may be downwardly pivoted and latched in place by plate 120 at a location where it engages the ground surface to serve as a kick stand for supporting the vehicle.

Flap assembly 112 is the same as flap assembly 110. Accordingly, like reference numerals have been applied to designate corresponding parts of the two flap assemblies. Flap assembly 112 operates in the same way as flap assembly 110, but turns the vehicle to the right rather than the left.

As shown in FIGS. 3, and 5-7, the rear well wheel 76 receives essentially the upper half of wheel 24 and is fixed to members 68 and 69 by any suitable means such as brackets 141. Thus, the entire assembly of rear wheel well 76, rear wheel 24, and framework 61 is pivotable as a unit about the horizontal axis of bolt assemblies 66 and 67.

As shown, rear wheel well 76 lies between members 68 and 69 and has a rectangular, elastically deformable flange 143. Flange 143 peripherally surrounds and extends horizontally outwardly from well 76 at the lower edge of the well. Flange 143 may be made from rubber or other flexible material.

As best shown in FIG. 3, the lower portion of well 76 and flange 143 are received in the rear wheel-receiving aperture 145 which is formed through the bottom of hull 26. Aperture 145 is configured to correspond to the configuration of flange 143, and flange 143 is dimensioned to contact and flex against the hull surfaces defining aperture 145. By this construction, flange 143 establishes a water-tight or at least an essentially water-tight seal between well 76 and hull 26 while allowing the assembly of wheel 24 and well 76 to ride up and down in aperture 145 under the influence of shock absorbers 62 and 63. Thus, this construction precludes the any substantial amount of water from passing upwardly through aperture 145 into the interior of the hull. With flange 143 engaging the walls of aperture 145, the rear wheel well 76 has the effect of defining an essentially or substantially water-tight continuation of hull 26.

As shown in FIG. 3, the bottom of hull 26 may be hollow to define a cavity 147. Cavity 147 may be filled with a suitable plastic material 149, such as a formed plastic.

By lowering both of the flaps 114 on land, the rear wheel 24 will be jacked up sufficiently to allow it to be dropped down for repair in the manner previously described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A two-wheeled amphibious cycle adapted for both land and water travel and comprising a frame, a vehicle steering front wheel unit supported by said frame and including (a) means rotatably mounting said front wheel and supported on said frame for manual rotation about a steering axis for steering the cycle on land, a motor-driven ground-engaging rear wheel rotatably supported from said frame, a floatation hull rigid with said frame, and seat means mounted on the assembly of said hull and said frame for occupancy by the driver of the amphibious cycle, said front and rear wheels being disposed one behind the other and protruding below the bottom of said hull for engagement with a ground surface during land travel, said hull being provided with downwardly opening front and rear wheel wells which define substantially watertight continuations of the bottom of said hull at least below the water line of said hull, and said front and rear wheels being partially received in said front and rear wells, respectively, said front wheel extending freely through an opening in the bottom of said hull, and said front wheel well being formed by a unit which is carried by a part of said front wheel mounting means and which provides a substantially watertight seal opposing entry of water into the hull through said opening, but allows unimpeded turning movement of the front wheel for steering the amphibious cycle on land.

2. The two-wheeled amphibious cycle defined in claim 1, wherein said unit forming said front wheel well comprises a hollow member extending completely around said front wheel and interfittingly received in said opening for rotation about its longitudinal axis.

3. The two-wheeled amphibious cycle defined in claim 2, wherein said hollow member is slidable in said opening along its longitudinal axis.

4. The two-wheeled amphibious cycle defined in claim 3, wherein said unit forming the front wheel well further includes a closure member fixed to said part and to said hollow member and closing the upper end of said hollow member.

5. The two-wheeled amphibious cycle defined in claim 4, wherein said unit forming said front wheel well includes a further member secured to said hollow member at the lower end thereof for disposal in said opening during water travel of said amphibious cycle, said further member being configured to provide a continuation of the bottom of said hull during water travel.

6. The two-wheeled amphibious cycle defined in claim 1, including a motor disposed rearwardly of said seat means, means drive connecting said motor to said rear wheel for rotating said rear wheel during both land and water travel, and means positioned on said rear wheel for propelling the amphibious cycle through water.

7. The two-wheeled amphibious cycle defined in claim 6, wherein the propelling means positioned on said rear wheel comprises a group of angularly spaced apart vanes secured to and projecting radially inwardly from the rim of said rear wheel.

8. The two-wheeled amphibious cycle defined in claim 7, wherein each of said vanes is formed by a pair of curved, side-by-side bucket portions.

9. The two-wheeled amphibious cycle defined in claim 6, wherein said rear wheel well and said rear wheel are mounted for pivotal displacement as a unit about a horizontal axis, and wherein said means drive connecting said motor to said rear wheel extends through said rear wheel well at a level above the water line for said hull.

10. The two-wheeled amphibious cycle defined in claim 1, including a support structure rotatably mounting said rear wheel and pivotally secured to said frame for pivotal movement about a horizontal pivot axis located forwardly of said rear wheel, shock absorber means, first means pivotally connecting said shock absorber means to said frame, and second means pivotally connecting said shock absorber means to said support structure at a location rearwardly of said pivot axis, one of said first and second means being removable to provide for the downward displacement of said rear wheel about said pivot axis to a lowered position relative to said hull.

11. The two-wheeled amphibious cycle defined in claim 1, wherein said hull is a single unitary structure having a longitudinal axis in alignment with the longitudinal axis of said frame.

12. The two-wheeled amphibious cycle defined in claim 1, including a wind shield mounted on and extending upwardly and rearwardly from the bow of said hull, and wherein said means mounting said front wheel comprises a fork assembly journalled in a part of said frame and having a pair of arms extending on opposite sides of said front wheel and supporting the axle of said front wheel, there being handlebar means located rearwardly of said shield and connected to a part of said fork assembly for manually turning said front wheel about said steering axis.

13. The two-wheeled amphibious cycle defined in claim 1, including first and second flap assemblies disposed on opposite sides of a vertical plane containing the longitudinal axis of said hull, said first flap assembly being foot-operated for turning the amphibious cycle to the left, and said second flap assembly being foot-operated for turning the amphibious cycle to the right, each of said flap assemblies comprising a flap pivotally secured to said hull on the underside thereof and normally biased to a stowed position, and foot operated means for pivotally displacing said flap to a position where it depends from the bottom of said hull to increase the resistance to the movement of the hull through the water for turning the amphibious cycle in a predetermined direction.

14. The two-wheeled amphibious cycle defined in claim 13, wherein each of said flap assemblies includes means for releasably latching its flap in a depending position at at least one pre-selected angle relative to the bottom of said hull.

15. The two-wheeled amphibious cycle defined in claim 1, including a manually operated mechanism having a flap member for turning said amphibious cycle in a predetermined direction during water travel and serving as a kick stand to support the amphibious cycle on land.

16. The two-wheel amphibious cycle defined in claim 1 wherein said rear wheel well extends into an opening which is formed through the bottom of said hull for receiving said rear wheel, wherein shock absorber means are connected intermediate said frame and the assembly of said rear wheel and said rear wheel well to provide up-down movement of the assembly of said rear wheel and said rear wheel well, and wherein means are provided to establish an essentially watertight seal between said rear wheel well and said hull while allowing movement of said rear wheel well relative to said hull under the action of said shock-absorber means.

17. A two-wheeled amphibious cycle adapted for both land and water travel and comprising a frame, a vehicle steering front wheel unit supported by said frame and including (a) a ground-engaging front wheel and (b) means rotatably mounting said front wheel and supported on said frame for manual rotation about a steering axis for steering the cycle on land, a motor-driven ground-engaging rear wheel rotatably supported from said frame, a rigid, unitary floatation hull rigid with said frame to render the amphibious cycle buoyant in the water, seat means mounted on the assembly of said frame and said hull for occupancy by the driver of the amphibious cycle, and motor-driven water-engaging propulsion means for propelling the amphibious cycle in the water, said front and rear wheels being disposed one behind the other and protruding below the bottom of said hull for engagement with a ground surface during land travel to provide for motor-driven travel on land without requiring removal of said hull, said hull having a water-engaging bottom wall lying below the hull's water line and extending the full length of said hull, said bottom wall encircling and extending between said front and rear wheels to form two separate spaced apart apertures, said front wheel extending through one of said apertures, and said rear wheel extending through the other of said apertures, said hull being provided with spaced apart downwardly opening front and rear wheel wells which define substantially watertight continuations of said bottom wall at least below the water line of said hull, said front wheel being partially received in said front well and protruding below the hull during water travel, and said rear wheel being partially received in said rear well so that it also protrudes below the hull during water travel.

18. The two-wheeled amphibious cycle defined in claim 17 wherein said hull is provided with upstanding sides which delimit a hollow driver's compartment and which are notched out just forwardly of said seat means to a level lying below a horizontal portion of said seat means, and wherein said bottom wall lies below said level and also below the rotational axes of said wheels when the wheels engage a ground surface on land.

19. The two-wheeled amphibious cycle defined in claim 17 including means for pivotally mounting said rear wheel on said frame for swinging movement about a horizontal axis between a raised operative position and a lowered inoperative position where said rear wheel is lowered relative to said hull by sufficient distance to make said rear wheel accessible for performing work thereon, and further means retaining said rear wheel in said raised position, said further means being selective manipulatable for lowering said rear wheel to said lowered position.

20. The two-wheeled amphibious cycle defined in claim 17 comprising a motor mounted on said frame above the water line of said hull, and means drive connecting said motor to said rear wheel for imparting rotation to said rear wheel.

21. The two-wheeled amphibious cycle defined in claim 20 wherein said water-engaging propulsion means is mounted on said rear wheel for rotation therewith.

22. The two-wheeled amphibious cycle defined in claim 20 comprising means mounted on said frame and defining a compartment receiving said motor, said motor partially underlying said seat means.

23. The two-wheeled amphibious cycle defined in claim 20 wherein said front well has an endless side wall encircling said front wheel, and wherein said rear well also has an endless side wall encircling said rear wheel, the side wall of said rear well having an endless watertight portion extending between said bottom wall and the water line of said hull.

* * * * *